(12) United States Patent
Yang et al.

(10) Patent No.: US 9,758,607 B2
(45) Date of Patent: Sep. 12, 2017

(54) POLYMER WITH ANTIBACTERIAL ACTIVITY

(71) Applicant: Research Foundation of the City University of New York, New York, NY (US)

(72) Inventors: Nan Loh Yang, Staten Island, NY (US); Ashish Punia, Staten Island, NY (US)

(73) Assignee: Research Foundation of the City University of New York, New York, NY (US)

( * ) Notice: Subject to any disclaimer, the term of this patent is extended or adjusted under 35 U.S.C. 154(b) by 139 days.

(21) Appl. No.: 14/510,686

(22) Filed: Oct. 9, 2014

(65) Prior Publication Data
US 2015/0105526 A1    Apr. 16, 2015

Related U.S. Application Data

(60) Provisional application No. 61/889,401, filed on Oct. 10, 2013.

(51) Int. Cl.
*C08F 220/36* (2006.01)
*C08F 220/34* (2006.01)

(52) U.S. Cl.
CPC .......... *C08F 220/36* (2013.01); *C08F 220/34* (2013.01)

(58) Field of Classification Search
CPC ............................ A61K 31/765; C08F 220/18
See application file for complete search history.

(56) References Cited

U.S. PATENT DOCUMENTS

| 8,278,309 B2 | 10/2012 | DeGrado et al. | |
| 2006/0008490 A1* | 1/2006 | Russell | A01N 33/12 424/402 |
| 2006/0024264 A1 | 2/2006 | Kuroda et al. | |
| 2007/0048249 A1 | 3/2007 | Youngblood et al. | |
| 2007/0292486 A1 | 12/2007 | Sen et al. | |
| 2010/0034770 A1 | 2/2010 | Mize | |
| 2010/0048849 A1 | 2/2010 | Eckert et al. | |
| 2012/0197004 A1 | 8/2012 | Hicks et al. | |
| 2013/0231604 A1 | 9/2013 | Jones et al. | |

FOREIGN PATENT DOCUMENTS

| CN | 101122744 A | | 2/2008 |
| CN | 101560005 A | * | 10/2009 |
| CN | 101580526 A | | 11/2009 |
| DE | 4337629 A1 | | 4/1993 |
| WO | WO2008119688 A1 | | 10/2008 |
| WO | WO2009049370 A1 | | 4/2009 |
| WO | WO2010030582 A3 | | 3/2010 |
| WO | WO2011075734 A2 | | 6/2011 |
| WO | WO2012056947 A1 | | 5/2012 |
| WO | WO2012091089 A1 | | 7/2012 |
| WO | WO2014095414 A1 | | 6/2014 |

OTHER PUBLICATIONS

Machine translation of CN 101560005 A, 2009.*
Palermo, Edmund F. et al., "Cationic Spacer Arm Design Strategy for Control of Antimicrobial Activity and Conformation of Amphiphilic Methacrylate Random Copolymers", ACS Publication, 2012 American Chemical Society, dx.doi.org/10.1021/bm300342u/ Biomacromolecules 2012, 13, 1632-1641, 10 pgs.
Kuroda, Kenichi et al., "Amphiphilic Polymethacrylate Derivatives as Antimicrobial Agents", 2005 Journal of American Chemistry, 127, 4128-4129, 2 pgs.
Palermo, Edmund F. et al., "Chemical Structure of Cationic Groups in Amphiphilic Polymethacrylates Modules the Antimicrobial and Hemolytic Activities", 2009 American Chemical Society, 10.1021/ bm900044x Published on Web Apr. 8, 2009, 1416-1428, 13 pgs.
Lienkamp, Karen et al.,"Antimicrobial Polymers Prepared by ROMP with Unprecedented Selectivity: A Molecular Constrtuctin Kit Approach", Journal of American Chemical Society, 2008, 130, 9836-9843, 8 pgs.

* cited by examiner

*Primary Examiner* — Wenwen Cai
(74) *Attorney, Agent, or Firm* — Peter J. Mikesell; Schmeiser, Olsen & Watts, LLP (57) ABSTRACT

A polymer with antibacterial activity is provided. The polymer has multiple groups of cationic amines, each group spaced from the polymer backbone by alkylene spacers of different lengths. The resulting polymer maintains significant antibacterial activity while having reduced hemolytic activity relative to a homopolymer that uses hexylene spacers.

15 Claims, 3 Drawing Sheets

| Polymer | f(6)(1) | f(2)(2) | Mw(kDa) | Mn(kDa) | PDI | DP (3) | MIC (E. coli)4 | MIC (S. aureus)4 | HC50 (4) | HC50/MIC (E. coli) (5) | HC50/MIC (S. aureus) (5) |
|---|---|---|---|---|---|---|---|---|---|---|---|
| PM6-0% | 0 | 100 | 6.2 | 4.3 | 1.45 | 30 | 1428 | 104 | >2000 | >1.4 | >19 |
| PM6-10% | 11 | 89 | 6.6 | 4.5 | 1.47 | 39 | 809 | 62 | >2000 | >2.5 | >32 |
| PM6-20% | 21 | 79 | 6.3 | 4.3 | 1.46 | 33 | 250 | 62 | >2000 | >8 | >32 |
| PM6-30% | 30 | 70 | 6.6 | 4.5 | 1.46 | 33 | 125 | 52 | 1667 | 13 | 32 |
| PM6-40% | 40 | 60 | 6.8 | 4.6 | 1.46 | 30 | 62 | 52 | 1619 | 26 | 31 |
| PM6-50% | 52 | 48 | 6.9 | 4.6 | 1.49 | 25 | 52 | 52 | >2000 | >38 | >38 |
| PM6-60% | 61 | 39 | 6.7 | 4.6 | 1.48 | 30 | 41 | 31 | >2000 | >49 | >64 |
| PM6-70% | 71 | 29 | 7.1 | 4.8 | 1.47 | 25 | 26 | 31 | >2000 | >80 | >64 |
| PM6-80% | 81 | 19 | 7.8 | 5.4 | 1.46 | 31 | 16 | 26 | >2000 | >125 | >80 |
| PM6-90% | 91 | 9 | 7.2 | 5.1 | 1.42 | 29 | 7.8 | 16 | 1619 | 208 | 101 |
| PM6-100% | 100 | 0 | 7.5 | 5.8 | 1.28 | 36 | 5.8 | 16 | <1.9 | <0.33 | <0.12 |

1 Actual mole% of six-carbon spacer monomer as calculated by proton NMR
2 Actual mole% of two-carbon spacer monomer as calculated by proton NMR
3 As calculated from proton NMR
4 micrograms per mL
5 selectivity ratio

POLYMER WITH ANTIBACTERIAL ACTIVITY

CROSS-REFERENCE TO RELATED APPLICATIONS

This application is a non-provisional of U.S. Patent Application Ser. No. 61/889,401 (filed Oct. 10, 2013) the entirety of which is incorporated herein by reference.

BACKGROUND OF THE INVENTION

The subject matter disclosed herein relates to polymers with antibacterial properties. Antibiotic resistant bacteria, such as Vancomycin-resistant *Enterococcus faecium* (VRE), Methicillin-resistant *Staphylococcus aureus* (MRSA), and Fluoroquinolone-resistant *Pseudomonas aeruginosa* pose a serious clinical threat to people around the globe. The presence of these multidrug resistant bacteria (superbugs) in hospitals is responsible for around 5% of the total hospital admissions in United States, and more than 20,000 people die in United States alone from superbugs' infections. Thus, antibiotic drug resistant bacteria takes a huge toll on human lives and put enormous financial burden on the health care system. Hence there is an urgent need to develop novel antibacterial agents that can act against the superbug infections, and toward which the development of bacterial resistance is highly thwarted. Despite this urgent need, there has been a steady decline in the development of new antibacterial agents. The significant cost of antibiotic drug development and rapid expansion of bacterial resistance towards antibiotics are considered major reasons behind the diminished efforts in new antibiotic development. In comparison with the target specific mode of action of conventional antibiotics, natural host defense antimicrobial peptides (AMPs) act to rupture the bacterial cell surface through non-specific lipophilic and electrostatic interactions. AMPs, present in various plants and animal species, share the common characteristics of amphiphilic structure, which is the presence of cationic and hydrophobic segments throughout the peptide backbone. AMPs have small size (around 20 amino acid residues) and are known to display broad spectrum antibacterial activity. Cationic AMPs preferentially bind to the anionic bacterial cell surface through electrostatic interactions followed by permeabilization into the hydrophobic core of lipid bilayer through hydrophobic interactions, leading to the pore formation in cell membrane, membrane depolarization, and through various other modes of action result in the bacterial cell death. Microbes are highly unlikely to acquire the resistance towards AMPs, as the microbes would need to change the entire cell membrane structure and composition. The large scale application of AMPs is challenging due to the costly and time consuming synthesis or isolation of AMPs. Furthermore, the oral administration of AMPs would be difficult due to proteolysis. On the other hand, synthetic amphiphilic polymers mimicking the design characteristics of AMPs can be produced on large scale, cost effectively, due to their simple design and structural versatility. The past few years have seen an increased research interest in the area of synthetic amphiphilic polymers including polymers based on polynorbornenes, polymethacrylates, poly(vinyl pyridine)s, and polystyrenes, among others. However, the high toxicity of synthetic amphiphilic polymers toward mammalian cells has been a challenge toward their therapeutic applications, and synthetic amphiphilic polymers with highly selective (bacteria over mammalian cells) are highly desired to combat the threat of superbug infections. The discussion above is merely provided for general background information and is not intended to be used as an aid in determining the scope of the claimed subject matter.

BRIEF DESCRIPTION OF THE INVENTION

A polymer with antibacterial activity is provided. The polymer has multiple groups of cationic amines, each group spaced from the polymer backbone by alkylene spacers of different lengths. An advantage that may be realized in the practice of some disclosed embodiments of the polymer is that the polymer has significant antibacterial activity while having reduced hemolytic activity relative to a homopolymer that uses hexylene spacers.

In a first embodiment, a polymer with antibacterial activity is provided. The polymer comprises a polymer backbone and a plurality of first cationic amines, each spaced from the polymer backbone by respective first alkylene spacers; and a plurality of second cationic amines, each spaced from the polymer backbone by respective second alky spacers, wherein the second alkylene spacer is longer than the first alkylene spacer.

In a second embodiment, a polyacrylate with antibacterial activity is provided. The polymer comprises a polymer backbone; a plurality of first cationic amines, each spaced from the polymer backbone by respective first alkylene spacers; and a plurality of second cationic amines, each spaced from the polymer backbone by respective second alkylene spacers, wherein the second alkylene spacer is at least one carbon longer than the first alkylene spacer; wherein the first alkylene spacer is joined to the polymer backbone by a first ester moiety and the second alkylene spacer is joined to the polymer backbone by a second ester moiety.

In a third embodiment, a polyacrylate with antibacterial activity is provided. The polymer comprises a structure of:

wherein q is non-zero and is less than one;
n and m are non-zero integers and n is greater than m;
$R_1$, $R_2$, $R_3$, $R_4$, $R_5$ and $R_6$ are independently selected from the group consisting of hydrogen and an alkyl;
$X^-$ is a counter ion.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which.

DETAILED DESCRIPTION OF THE INVENTION

One of the major challenges towards therapeutic applications of amphiphilic polymers is their toxicity toward red blood cells (RBCs). Without wishing to be bound to any particular theory, hemolytic activity of synthetic amphiphilic polymers may arise from hydrophobic interactions between lipid membrane of erythrocytes and hydrophobic components of the amphiphilic polymers. Hence, reduction in hydrophobicity of polymers may lead to lower hemolytic activity. The presence of large number of cationic charges along with absence or lower number of hydrophobic moieties, as in cases of cationic homopolymers based on polymethacrylates, polynorbornenes etc, have been shown to reduce hemolytic activity, but higher number of cationic charge usually leads to lower antibacterial activity, especially against gram negative bacteria like *E. coli*. Reduction of hemolytic activity in alkylated poly(vinyl pyridine)s by the addition of hydrophilic groups like poly(ethylene glycol) have been reported. The effect of spacer arm length (distance between polymer backbone to cationic center) on antibacterial activity of amine functionalized polymethacrylates has recently been explored. An amine functionalized amphiphilic polymethacrylate homopolymer having six carbon spacer was found to be highly active towards both *E. coli* and *S. aureus*, but extremely toxic toward RBCs.

In one embodiment, a polymer with antibacterial activity is provided. The polymer may be synthesized according to general Scheme 1.

Scheme 1

In the embodiment of Scheme 1, two different acrylate monomers are selected that have different alkylene spacers such that n is greater than m to provide one alkylene spacer that is longer than the other alkylene spacer. In one embodiment, n is at least two carbons greater than m. In another embodiment, n is at least four carbons greater than m. In one such embodiment, n is four carbons greater than m. For example, m may be two (an ethylene spacer) and n may be six (a hexylene spacer). The alkylene spacers may be n-alkylene (straight, unbranched alkylenes) spacers. In the embodiment of Scheme 1, the monomers are acrylates and the resulting polymer has ester moieties joining the alkylene spacers to the polymer backbone. The resulting polymer comprises cationic amines where $R_1$ to $R_6$ are independently selected from hydrogen and alkyl groups such as methyl, ethyl and propyl.

In another embodiment, a mixed polyacrylate was formed from a reaction mixture comprising a two-carbon spacer monomer (m=2) and six-carbon spacer monomer (n=6). See Scheme 2. The resulting mixed polyacrylate had reduced hemolytic activity (relative to a corresponding homopolymer from a six-carbon spacer).

Scheme 2:

Without wishing to be bound to any particular theory, the inclusion of a two-carbon spacer monomer is believed to reduce the hydrophobicity of the resulting mixed polyacrylate and the presence of a cationic charge on each repeating unit may also hinder the interactions of the polyacrylate with the hydrophobic core of RBCs' lipid bilayer. Moreover, due to difference in spacer lengths of adjacent cationic charges, local charge density may be less, which may not adversely affect the antibacterial activity of polymers.

In one embodiment, a polyacrylate homopolymer is provided with a two carbon spacer as the alkylene tail attaching the cationic nitrogen center to the polymer backbone. The two carbon spacer polyacrylates have less hemolytic activity towards RBCs (relative to a corresponding polyacrylate with a six carbon spacer), while being antibacterial against S. aureus.

The toxicity of mixed polyacrylates was reduced by approximately 850 times by adding only 10 mole % of a two-carbon spacer. No significant reduction in antibacterial activity towards E. coli and S. aureus was observed. Mixed polyacrylates containing 10% to 90% of the two-carbon spacer monomer with the remainder being the six-carbon spacer monomer, displayed highly selective activity towards bacteria over RBCs.

Figure 1:
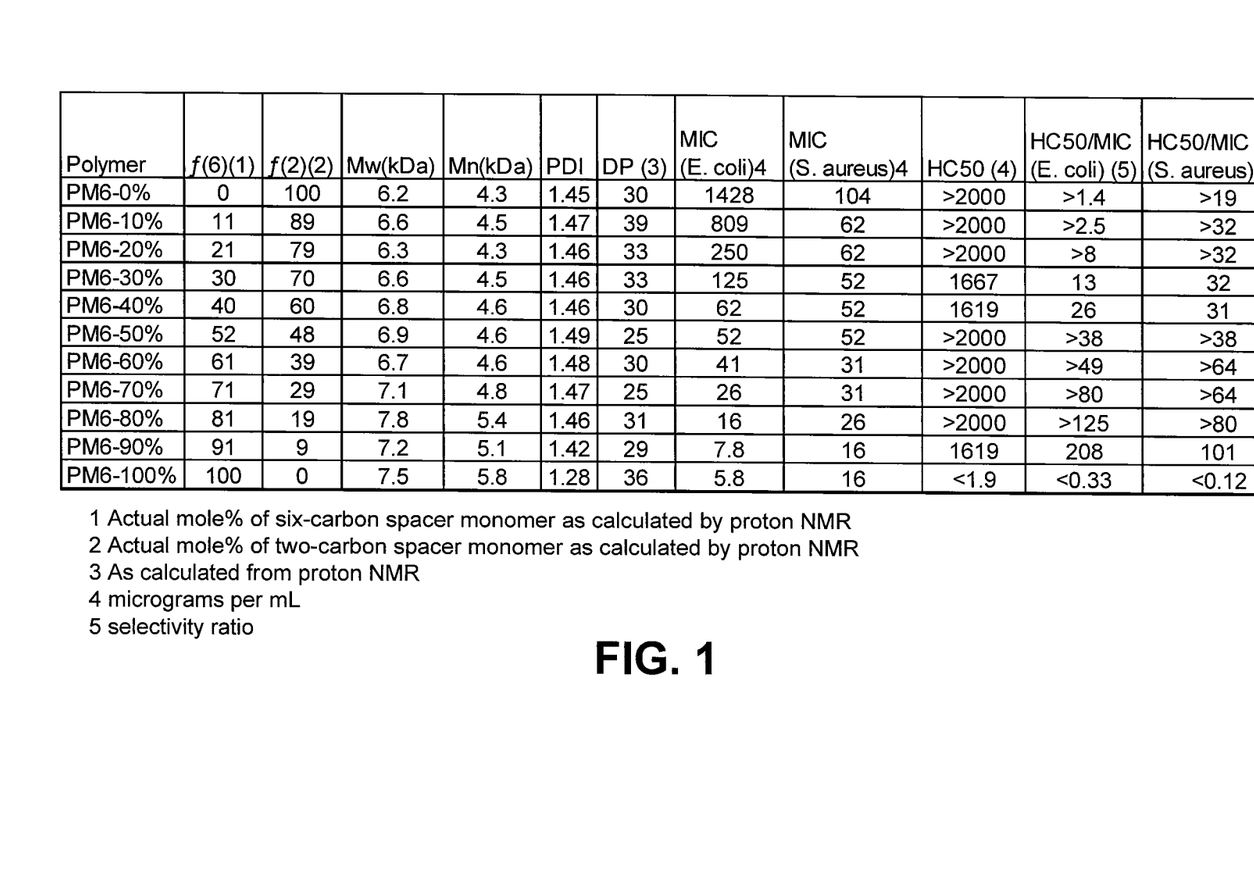
FIG. 1 depicts a table showing various chemical and biological properties of select polymers.

As shown in Scheme 1, a series of polyacrylates copolymers were synthesized via free radical polymerization of 2-((tert-butoxycarbonyl)(methyl)amino)ethyl acrylate (two-carbon spacer) and 6-((tert-butoxycarbonyl)amino)hexyl acrylate (six-carbon spacer), using azobisisobutyronitrile (AIBN) as initiator and methyl 3-mercaptopropionate as chain transfer agent, followed by de-protection of Boc groups using excess trifluoroacetic acid. As shown in FIG. 1, the feed mole % of the six-carbon spacer was increased in increments of 10%, and actual mole ratios in the polymer were found by proton Nuclear Magnetic Resonance ($^1$H NMR) to closely match the feed mole ratios. The molecular weights of precursor copolymers (before de-protection) were estimated against linear polystyrene standards, using Gel Permeation Chromatography (GPC). Molecular weights of all polymers were similar in the range of $M_n$ around 4.6 k g/mol (GPC).

In the table depicted in FIG. 1, PM6-x %, is the cationic amphiphilic copolymer having x mole % of the six-carbon spacer. The antibacterial activities of polymers, in terms of Minimum Inhibitory Concentration (MIC), were determined against the gram negative E. coli (TOP 10, ampicillin resistant) and gram positive S. aureus (ATCC 25923). MIC is expressed as the minimum polymer concentration that resulted in 100% inhibition of bacterial growth after an incubation period of 18 hours. Hemolytic activities of polymers were determined against freshly drawn mouse RBCs in terms of hemolytic concentration-50% ($HC_{50}$), which is defined as the minimum polymer concentration resulting in 50% lyses of RBCs within an incubation period of 1 hour. Each experiment was done in triplicate, and the values reported here are the averages of three independent experiments performed on different days.

Figure 2A:
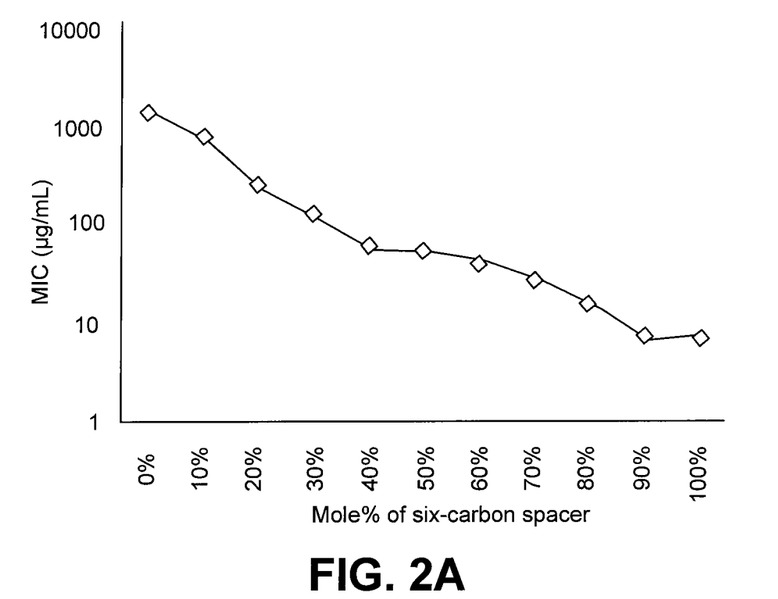
FIG. 2A and FIG. 2B are graphs showing the Minimum Inhibitory Concentration (MIC) against *E. coli* and *S. aureus*, respectively, of various polymers as a function of the mole percentage of hexylene spacer.
Figure 2B:
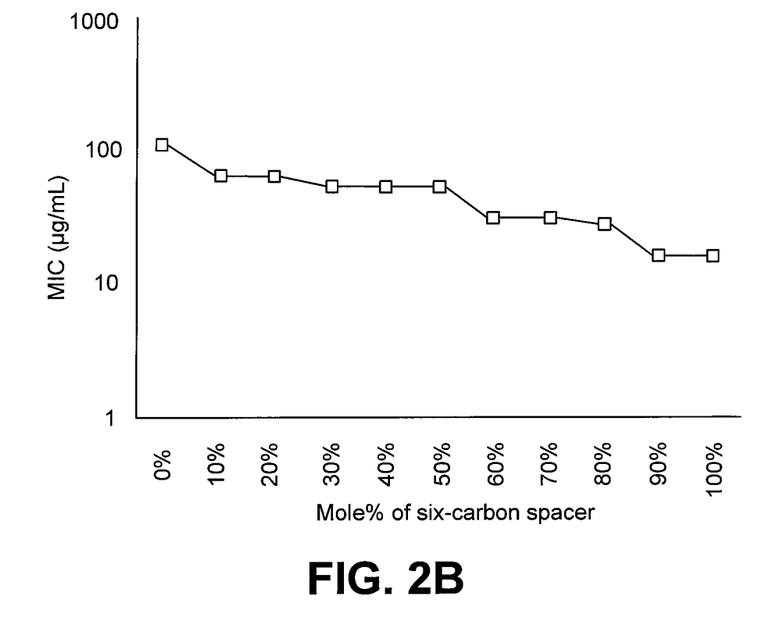
Figure 2C:
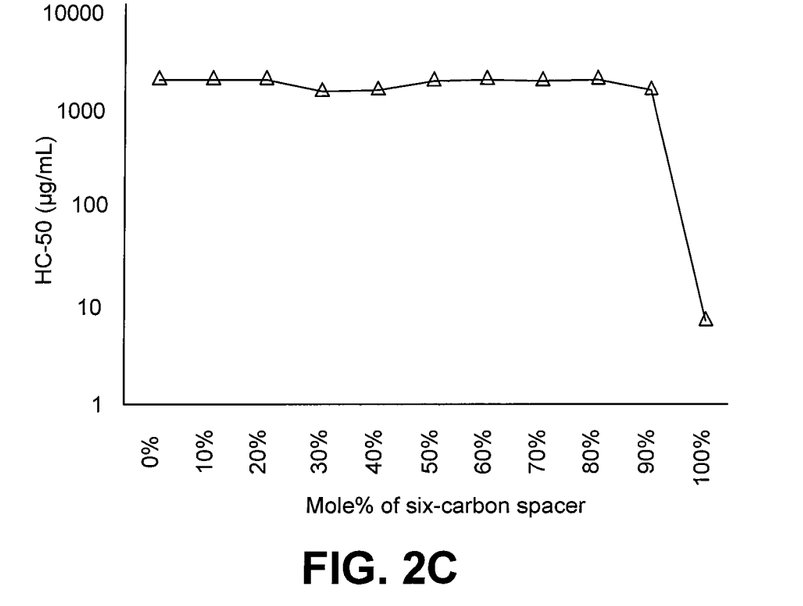
FIG. 2C is a graph showing hemolytic concentration-50% ($HC_{50}$) against red blood cells (RBC) as a function of the mole percentage of hexylene spacer.
Figure 2D:
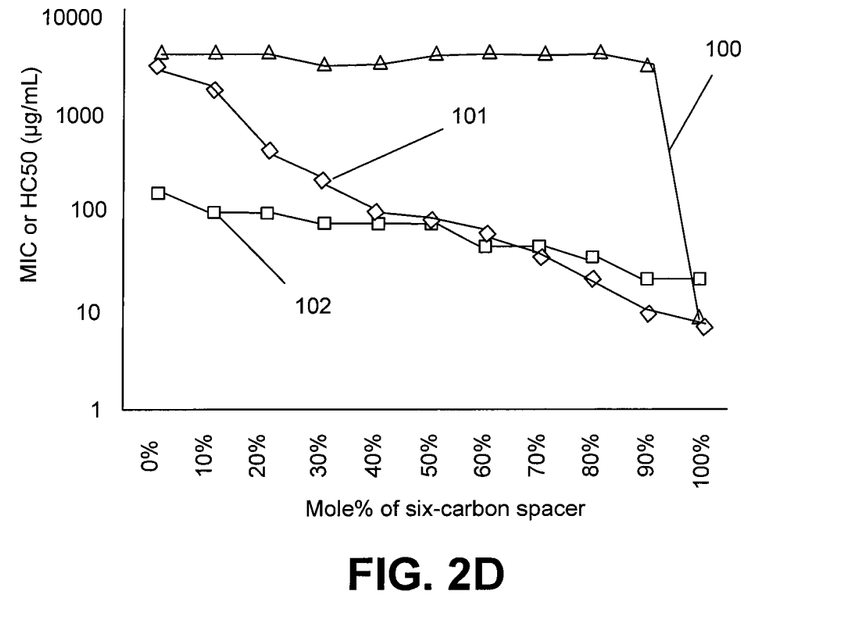
FIG. 2D is a graph showing the $HC_{50}$ and MIC against both *E. coli* and *S. aureus* as a function of the mole percentage of hexylene spacer, all on the same graph.

As shown in FIG. 1, FIG. 2A, FIG. 2B, FIG. 2C. and FIG. 2D, antibacterial activities of polymers towards E. coli were increased by adding increasing amounts of the six-carbon spacer. FIG. 2A and FIG. 2B shows MIC values for E. coli and S. aureus, respectively, as a function of mole percentage of the six-carbon spacer. FIG. 2C depicts the hemolytic activity of polymers against mouse RBCs. FIG. 2D illustrates $HC_{50}$ (line 100), the MIC against E. coli (line 101) and the MIC against S. aureus (line 102).

PM6-0% (MIC: 1428 micrograms/mL) is inactive against E. coli. Adding a small percentage of the six-carbon monomer resulted in significant improvement in antibacterial activity (e.g. 250 micrograms/mL for PM6-20%) against E. coli. PM-90% and PM-100% displayed highest antibacterial activity towards E. coli (MIC: less than 8 micrograms/mL) in this series of polymers. The effect of adding the six-carbon spacer on antibacterial activity towards S. aureus was less pronounced, as compared to E. coli (see FIG. 1B and the table of FIG. 2). No substantial increase in activity against S. aureus was observed until 50 mol % of the six-carbon spacer. Adding 90% of the six-carbon spacer (PM6-90%) led to a 6.5-fold reduction in MIC value against S. aureus (relative to PM6-0%), whereas the same copolymer produced almost a 183 fold reduction in MIC value against E. coli.

$HC_{50}$ values are shown in FIG. 2C and the table of FIG. 1. Surprisingly, all polymers, except PM6-100%, had low hemolytic activity against RBCs. In comparison with extremely hemolytic PM6-100%, polymer PM6-90% was found to be approximately eight hundred and fifty times less hemolytic towards RBCs, even though the antibacterial activities of PM6-90% are comparable to PM6-100%. Hence, the addition of only 10% of the two-carbon spacer led to substantial reduction in hemolytic activity without compromising antibacterial activity.

Increasing the six-carbon spacer concentration from PM6-0% to PM6-20% did not show any significant hemolytic activity until the highest concentration tested (2000 micrograms/mL). PM6-30% to PM6-90% gave $HC_{50}$ value of more than 1500 micrograms/mL. The selectivity of the polymers toward bacteria over RBCs is apparent from FIG. 2D and the table of FIG. 1. PM6-100% homopolymer exhibited strong antibacterial properties but was non-selective with regard to RBC. PM6-90% was found to be over two hundred times more selective towards E. coli, and over one hundred times more selective towards S. aureus over RBCs, while displaying same antibacterial activity as PM6-100%. PM6-80% is over one hundred and twenty five times more selective towards *E. coli* over RBCs and almost eighty times more selective towards *S. aureus* over RBCs. All copolymers in the range of 0 to 90% six-carbon spacer, manifested highly selective antibacterial activity (bacteria over RBCs). Moreover, the polymers manifested selective activity toward one type of bacteria over another. Polymers containing 0 to 60% of the six-carbon spacer, displayed selective antibacterial activity against *S. aureus* over *E. coli*, while polymers having 70 to 100 mol % of the six-carbon spacer displayed similar activity toward *E. coli* over *S. aureus*.

Cationic amphiphilic homopolymers having cationic group on each repeating unit have generally shown low antibacterial activity, in comparison with copolymers having lower charge density and higher mole percent of hydrophobic repeating units. High density of cationic charge in homopolymers may hinder their interaction with the hydrophobic core of bacterial lipid membrane. Polymer PM6-0%, with its high charge density and less degree of hydrophobicity, is inactive against *E. coli*, but displayed high activity towards *S. aureus*. The double membrane structure of *E. coli* is more difficult to penetrate than the single membrane structure of *S. aureus*. Also, *S. aureus* have around 15-80 nm thick negatively charged murein layer (peptidoglycans) covering the lipid bilayer (phospholipids), whereas *E. coli* has a thin (around 6 nm) peptidoglycan layer which is sandwiched between the outer and the inner membrane. This may result in higher columbic interactions between PM6-0% and *S. aureus*, as compared to *E. coli*. By copolymerizing a six-carbon spacer with a two-carbon spacer, not only is the hydrophobic component in the polymer increased, but the spatial distance between cationic charges is also increased. This may have led to a lower local cationic charge density, and thus higher antibacterial activity. With increase in mol % of the six-carbon spacer, the antibacterial activity of polymer against *E. coli* rapidly increased.

Polymer PM6-100% is highly hemolytic ($HC_{50}$ less than 7 micrograms/mL) so the addition of even small amount of six-carbon spacer in the copolymer would have been predicted to rapidly increase the hemolytic activity. However, until 90 mol % of six-carbon spacer, the polymers did not display substantial hemolytic activity. Addition of hydrophobic monomers has previously shown to drastically increase the hemolytic activity even in the range of 20-30 mol % of hydrophobic monomer. Lipid bilayer of RBCs is mainly comprised of the zwitterionic phospholipids and thus lacks a net negative charge on its outer surface. Hence, the amphiphilic polymers interact with RBCs' lipid membrane mainly via the hydrophobic interactions with the hydrophobic core of RBCs' lipid bilayer. The presence of cationic charge on all repeat units would disfavor the hydrophobic interactions of alkylene spacer with lipid bilayer, and may have led to lower ability of these polymers to rupture the membrane of red blood cells.

EXPERIMENTAL

Materials: 2-(Methylamino)ethanol, methyl 3-mercaptopropionate (MMP), acetonitrile (anhydrous), N,N-diisopropylethylamine, 2,2'-Azobis(2-methylpropionitrile) (AIBN), tetrahydrofuran, and 6-Amino-1-hexanol were purchased from sigma-aldrich and used without further purification. Acryloyl chloride was purchased from sigma-aldrich and distilled prior to use. Di-tert-butyl dicarbonate, trifluoroacetic acid, hexane, and diethyl ether were purchased from Alfa Aesar and used as received. Dichloromethane and ethyl acetate were purchased from BDH. All other chemicals and reagents were used without further purification.

Instrumentation: $^1H$ and $^{13}C$ NMR of polymers were obtained on a Varian Unity NMR spectrometer (600 MHz) using $CDCl_3$ or $DMSO-d_6$ as solvents. Molecular weights and polydispersity of Boc-protected polymers were estimated on EcoSec HLC-83220 gel permeation chromatography instrument using linear polystyrene standards and tetrahydrofuran as eluent. Bacterial growth in *E. coli* and *S. aureus* assays were determined by optical density at $\lambda=600$ nm ($OD_{600}$), measured on an Agilent 8453 spectrophotometer using 1 cm path length plastic cuvette. SpectraMax 340 PC microplate reader from Molecular devices was used to measure $OD_{595}$ (Antibacterial test) and $OD_{414}$ (Hemolysis test).

Synthesis of N-Boc protected 6-hexanol-1-hexanol (42 mmol) di-tert-butyldicarbonate in 20 mL tetrahydrofuran was added dropwise to a 250 mL round bottom flask, already charged with 4.92 g (42 mmol) 6-hexanol-1-amine, 30 mL THF, and 50 mL 1M NaOH. The biphasic reaction mixture was stirred at room temperature for 24 hours. The reaction mixture was extracted with ethyl acetate, and subsequently washed with water and sat. sodium bicarbonate solution. The resulting organic layer was dried with sodium sulfate, and solvent was evaporated using rotavapor.

Synthesis of N-Boc protected 2-(Methylamino)ethanol 27 mL (118 mmol) di-tert-butyldicarbonate was added dropwise to a 250 mL round bottom flask, already charged with 8.6 mL (107 mmol) 2-(methylamino)ethanol and 110 mL distilled water. Water was used both as a catalyst and solvent. The reaction mixture was left for stirring at 34° C. for 3 hours, followed by extraction with ethyl acetate (3*125 mL). The organic layer was dried with sodium sulfate, and solvent was evaporated using rotavapor to obtain pure compound in 90% yield.

Synthesis of Monomers:
6-((tert-butoxycarbonyl)amino)hexyl acrylate
(six-carbon spacer monomer)

N-Boc protected 6-hexanol-1-amine (5 g, 23 mmol), triethyl amine (4 mL), and dichloromethane (50 mL) were added into a 100 mL round bottom flask. The flask was sealed and reaction mixture was degassed with nitrogen for 5 minutes, using a stainless steel needle. A solution of acryloyl chloride (5 mL, 23 mmol) in 5 mL dichloromethane was added dropwise to the reaction mixture at 0° C. The reaction mixture was allowed to warm to room temperature and stirred overnight, followed by washing with distilled water and sat. sodium bicarbonate. The organic layer was dried with sodium sulfate and solvent was evaporated using rotavapor. The resultant liquid was purified using silica gel chromatography using 9:1 hexane/ethyl acetate as eluent.

Synthesis of 2-((tert-butoxycarbonyl)(methyl) amino)ethyl acrylate (two-carbon spacer monomer)

14.8 g (84.5 mmol) N-Boc protected 2-(methylamino) ethanol was added to a 500 mL round bottom flask already loaded with 130 mL dichloromethane and 22.6 mL (130 mmol) N,N-diisopropylethylamine. The flask was sealed and degassed with nitrogen for 5 minutes, using a stainless steel needle. 7.31 mL (90 mmol) Acryloyl chloride was added to reaction mixture at 0° C. The reaction mixture was allowed to warm to room temperature and stirred overnight. Reaction mixture was washed with distilled water, 10% citric acid, 10% potassium carbonate, and saturated sodium bicarbonate. Organic layer was dried with sodium sulfate, and solvent evaporated using rotavapor. Silica gel chromatography (hexane/ethyl acetate 1:1) was used to obtain pure monomer.

Synthesis of Polymers:

Homopolymers and random copolymers were synthesized using a modified literature procedure. Six-carbon spacer monomer (0.814 g, 3 mmol) and the two-carbon spacer monomer (0.688 g, 3 mmol) were added into a 100 mL round bottom flask containing AIBN (9.85 mg), MMP (33.2 microliters and 6 mL acetonitrile (anhydrous). The flask was sealed and reaction mixture was degassed with nitrogen for 5 minutes, followed by stirring at 65° C. for 18 hours. Solvent was evaporated under reduced pressure, and polymer was redissolved in 2 mL THF and precipitated in hexane twice. The resulting polymer was dissolved in excess of triflouroacetic acid (TFA) and left under stirring for 4 hours. TFA was removed under reduced pressure and polymer was dissolved in methanol and precipitated in diethyl ether 3 times. Resulting polymer was kept in vacuum for 3 days and lyophilized.

Preparation of polymer dilutions for antibacterial and hemolysis testing: Stock solution (20 mg/mL) for each polymer was prepared by dissolving the polymer in DMSO or in distilled water. Serial dilutions (2 fold) and some intermediate concentrations (14285 µg/mL, 7142.8 µg/mL, and 3846 µg/mL) were then obtained by further adding distilled water. As described in the antibacterial testing protocol below, a tenfold dilution would further take place in the 96 well assay plates. Control solutions (without polymers) were prepared in a similar way by diluting DMSO with distilled water.

Antibacterial Test

To assess antibacterial activities of polymers against gram negative bacteria, *Escherichia coli* TOP 10 (ampicillin resistant) were incubated at 37° C. in Luria Bertani (LB) broth (containing ampicillin, 100 micrograms/mL) for one day. $OD_{600}$ was obtained on Agilent 8453 spectrophotometer using a plastic disposable cuvette (1 cm path length) to measure bacterial cell growth. This cell suspension was diluted to obtain $OD_{600}$=0.1, by adding fresh LB broth (about 30 mL). The cell suspension was allowed to grow at 37° C. (under shaking) for 1.5 hours, and $OD_{600}$ increased to around 0.5 (log phase growth). Final stock cell suspension with $OD_{600}$=0.001 was obtained by further diluting with fresh LB broth. To each well of a 96 well sterile tissue culture plate (REF 353916, BD falcon, flat bottom), 90 microliters of cell stock suspension (with ampicillin) was added followed by addition of 10 microliters polymer solutions, or control solutions. Each polymer concentration was added in triplicate, and the assay plates were incubated at 37° C. for 18 hours. $OD_{595}$ values were obtained using SpectraMax 340 PC micro plate reader, and minimum inhibitory concentration (MIC) is defined as the lowest polymer concentration required to completely inhibit bacterial cell growth. MIC values reported in this study are the average of three MIC values obtained on different days. Solubility of antibacterial polymers in aqueous medium is highly desirable for in vivo applications. Lower solubility of polymers in water could also result in aggregates formation, resulting in much lower antibacterial activity. In our study, polymer solutions prepared from DMSO stock solution or distilled water stock solution, displayed similar antibacterial activity against *E. coli*.

Antibacterial activities of polymers against *Staphylococcus aureus* ATCC 295923 were examined by following similar protocol as described above for *E. coli*, except Mueller-Hinton (MH) broth was used in place of Luria-Bertani (LB) broth. MIC values reported in this study are the average of three MIC values obtained on different days under similar conditions.

Hemolytic Activity

Freshly drawn mouse Red blood cells (RBCs) were obtained by centrifuging mouse blood, and discarding white blood cells and plasma (supernatant). 4.5 mL of TBS (Tris buffer, 10 mM, pH=7, 150 mM NaCl) was added to 0.5 mL RBCs. In 250 microliters of this cell suspension, 10 mL of TBS was further added to obtain a stock cell suspension (40 fold dilution, 0.25% Red blood cells). 130 microliters of this stock solution was added to a 600 microliters centrifugation tube containing polymer solution (15 microliters) (or control solutions) and TBS (15 microliters). Centrifugation tubes were incubated at 37° C. for 1 hour, and then centrifuged for 4 minutes at 4000 rpm. The supernatant (30 microliters) was obtained and diluted with TBS (70 microliters) in a 96 well sterile assay plate (in triplicate). Hemoglobin concentration as optical density at $OD_{414}$ was obtained on microplate reader (SpectraMax 340 PC). 5% triton X-100 was used as a reference for 100% hemolysis (positive control), and control solution were used as a reference for 0% hemolysis. Polymer concentration required to cause 50% hemolysis ($HC_{50}$) was obtained by dividing $OD_{414}$ at each polymer concentration by $OD_{414}$ for Triton X-100 (100% hemolysis) and multiplying by 100. $HC_{50}$ values reported here are the averages of 3 independent experiments conducted on different days.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A polymer with antibacterial activity, the polymer consisting of
    a polymer backbone;
    a plurality of first cationic amines, each spaced from the polymer backbone by respective first alkylene spacers;
    a plurality of second cationic amines, each spaced from the polymer backbone by respective second alkylene spacers, wherein the second alkylene spacer is longer than the first alkylene spacer by at least four carbons, wherein the polymer has a number average molecular weight between about 3kDa and about 7 kDa.

2. The polymer as recited in claim 1, wherein the second alkylene spacer is a n-hexylene spacer and the first alkylene spacer is an ethylene spacer.

3. The polymer as recited in claim 1, wherein the first alkylene spacer is joined to the polymer backbone by a first ester moiety.

4. The polymer as recited in claim 3, wherein the second alkylene spacer is joined to the polymer backbone by a second ester moiety.

5. The polymer as recited in claim 1, wherein the first cationic amines and the second cationic amines are present in a mole ratio of at least 10:90.

6. The polymer as recited in claim 5, wherein the first cationic amines and the second cationic amines are present in a mole ratio of at least 20:80.

7. The polymer as recited in claim 6, wherein the first cationic amines and the second cationic amines are present in a mole ratio of at least 50:50.

8. A polyacrylate with antibacterial activity, the polymer consisting of
   a polymer backbone;
   a plurality of first cationic amines, each spaced from the polymer backbone by respective first alkylene spacers;
   a plurality of second cationic amines, each spaced from the polymer backbone by respective second alkylene spacers, wherein the second alkylene spacer is at least four carbons longer than the first alkylene spacer;
   wherein the first alkylene spacer is joined to the polymer backbone by a first ester moiety and the second alkylene spacer is joined to the polymer backbone by a second ester moiety, wherein the polymer has a number average molecular weight between about 3kDa and about 7 kDa.

9. The polyacrylate as recited in claim 8, wherein the first cationic amines and the second cationic amines are present in a mole ratio of at least 10:90.

10. The polyacrylate as recited in claim 8, wherein the first cationic amines and the second cationic amines are present in a mole ratio of at least 10:90.

11. The polyacrylate as recited in claim 8, wherein the polymer has a molecular weight between about 4 kDa and about 6 kDa.

12. A polyacrylate with antibacterial activity, the polymer consisting of a structure of:

wherein q is non-zero and is less than one;
n and m are non-zero integers and n is at least four greater than m;
$R_1, R_2, R_3, R_4, R_5$ and $R_6$ are independently selected from the group consisting of hydrogen and an alkyl; and
$X^{31}$ is a counter ion, wherein the polymer has a number average molecular weight between about 3 kDa and about 7 kDa.

13. The polyacrylate as recited in claim 12, wherein q is at least 0.1.

14. The polyacrylate as recited in claim 13, wherein m is at least two.

15. The polyacrylate as recited in claim 14, wherein m is two and n six.

* * * * *

UNITED STATES PATENT AND TRADEMARK OFFICE
CERTIFICATE OF CORRECTION

PATENT NO. : 9,758,607 B2
APPLICATION NO. : 14/510686
DATED : September 12, 2017
INVENTOR(S) : Yang et al.

Page 1 of 1

It is certified that error appears in the above-identified patent and that said Letters Patent is hereby corrected as shown below:

In the Claims

Column 12, Line 25, that portion of Claim 12 reading "-$X^{31}$ is a counter ion,-" should read "--$X^-$ is a counter ion,--"

Signed and Sealed this
Seventeenth Day of October, 2017

Joseph Matal
*Performing the Functions and Duties of the*
*Under Secretary of Commerce for Intellectual Property and*
*Director of the United States Patent and Trademark Office*